United States Patent Office 3,021,208
Patented Feb. 13, 1962

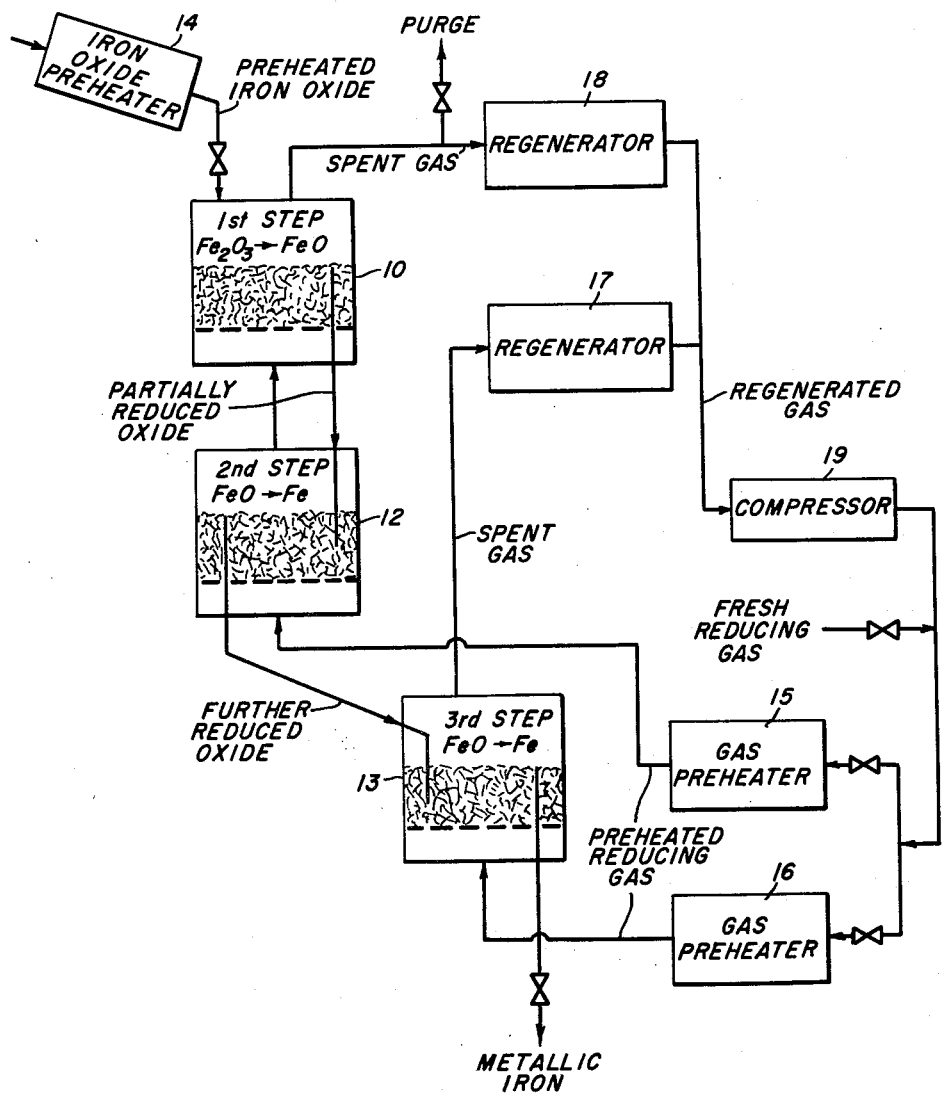

3,021,208
METHOD OF REDUCING ORE IN A
FLUIDIZED BED
Jerome Feinman, Pitcairn, Pa., assignor to United States
Steel Corporation, a corporation of New Jersey
Filed Mar. 23, 1961, Ser. No. 98,281
1 Claim. (Cl. 75—26)

This invention relates to an improved continuous direct reduction process for iron oxide in fluidized beds.

The present application is a continuation-in-part of my earlier co-pending application Serial No. 847,782, filed October 21, 1959, now abandoned.

In a conventional continuous direct reduction process, preheated iron oxide fines are treated in one or more fluidized beds with ascending currents of preheated reducing gas, commonly hydrogen which can contain limited amounts of CO. It is known that such processes advantageously can be conducted in two steps, a first step in which higher oxides are reduced to FeO and a second step in which FeO is reduced to metallic iron. Spent reducing gas from the second step can be used as a reductant in the first, since it retains capacity for reducing higher oxides after its constituents approach equilibrium for reducing FeO. Nevertheless such processes still have disadvantages. They do not readily remove more than about 90 percent of the oxygen originally present in the oxide, even though residence time of solids and gas in the second step is quite prolonged. Off-gas from the second step has greater reducing capacity than the first step can utilize, or conversely if the full reducing capacity were used in the first step, this step would produce more FeO than the second step can handle.

Numerous ways have been proposed for overcoming these difficulties, but so far as I am aware, none have been entirely successful. For example, the final product can be reduced to a greater degree by dividing the step in which FeO is reduced to metallic iron into two steps in series, making three reduction steps in all. The theory is that fewer non-reduced particles remain in the final product, since FeO particles which escape reduction in the middle step may be reduced in the third. When the reducing gas flows through the three steps in series counter to the oxide, a problem arises in supplying heat to the middle step. Reduction of iron oxide with hydrogen is endothermic and the necessary heat preferably is supplied by preheating the oxide and gas. Heat supplied to the middle step must be carried through the first and third steps; hence the amount of reduction in the middle step is quite limited. Previous three-step processes offer only a small improvement in gas utilization, since nearly the same excess reducing capacity remains in the gas used in the first step as in a two-step process. To improve gas utilization, it has been proposed to bypass part of the off-gas from the second step around the first, but this procedure does not improve the degree of reduction achieved in the final product.

Another continuous fluidized bed direct reduction process has been proposed in which iron oxide would be reduced to FeO in a preliminary reducing zone, FeO would be reduced to a mixture containing 70 to 95 percent metallic iron and 5 to 30 percent FeO in a main reducing zone, and this mixture would be reduced completely in a clean-up zone. The reductant in the main zone would be generated by partially combusting methane with air directly in the main zone and the reductant in the preliminary zone would be off-gas from the main zone. The reductant in the clean-up zone could be methane, hydrogen, or a mixture of hydrogen and CO. The product discharging from the main zone would be 83.3 to 97.4 percent reduced. In extensive work on the subject, the maximum reduction I have seen achieved in a continuous fluidized bed direct process is no more than about 95 percent under the most favorable conditions. Nevertheless, if the foregoing process can operate as proposed, reduction in the main zone or second step is carried to a degree which would leave the off-gas with excess reducing capacity unusable in the preliminary zone or first step.

An object of my invention is to provide an improved continuous direct reduction process which overcomes both the aforementioned difficulties, that is, a process which utilizes reductant efficiently in the first step, with proportionate increase in capacity for given sized equipment, and which reduces the final product to a higher degree than practical in a two-step process.

A more specific object is to provide an improved continuous three-step direct reduction process in which iron oxide flows in series through the three steps and the reducing gas flows in parallel through the second and third steps, and the foregoing advantages are attained by controlling the reduction in the second step to a relatively low critical range.

In the drawing, the single figure is a schematic flowsheet of my process.

As the drawing indicates, the apparatus in which my process is performed includes three fluidized bed reactors 10, 12 and 13. I introduce iron oxide fines to reactor 10 from a preheater 14 and thence pass this oxide through reactors 12 and 13 in series. I introduce separate streams of reducing gas from preheaters 15 and 16 to the reactors 12 and 13 in parallel, and of off-gas from one of these reactors to reactor 10. I route off-gas from the other reactor 12 or 13 and from the reactor 10 to respective regenerators 17 and 18. Preferably I purge a portion of the off-gas from reactor 10 to limit build up of inerts. I combine the gas from the two regenerators and introduce this gas to a compressor 19. I add fresh reducing gas to the regenerated and compressed off-gas to make up for the portions consumed in the process and purged, and introduce the combined fresh and regenerated gas to the preheaters 15 and 16. Preferably the reducing constituent of the gas consists essentially of hydrogen, although limited quantities of CO can be present. The reactors, preheaters, regenerators and compressor per se can be of conventional construction and hence are not shown nor described in detail. The apparatus of course includes conventional solids feeders, dust catches, controls and other necessary devices, which have been omitted from the showing in the interest of simplicity.

I heat the iron oxide to a temperature of 1500 to 1900° F. in the preheater 14, and the reducing gas to a temperature of about 1200 to 1600° F. in the preheaters 15 and 16. In my first reduction step conducted in reactor 10, I maintain a reaction temperature of about 1200 to 1500° F. and I reduce the oxide about 30 percent to a product predominantly FeO. In my second reduction step conducted in reactor 12, I maintain a reaction temperature of about 1000 to 1400° F. and I reduce FeO to an intermediate product from which about 63 to 71 percent of the original oxygen has been removed (that is, a product about 63 to 71 percent reduced). It should be noted this degree of reduction is substantially below that which I could achieve in this step, but I purposely limit the reduction by my high feed rate and high solids-to-gas ratio for reasons hereinafter explained. In my third reduction step conducted in reactor 13, I maintain about the same reaction temperature as in my second step and I reduce the intermediate product to a final product about 90 to 95 percent reduced. The final product discharging from the third step can be agglomerated and handled in any conventional way.

To achieve the desired degree of reduction at the end of the second step, I control the solids-to-gas ratio in this step to a range of about 35 to 65 pounds of iron per 1000 standard cubic feet of hydrogen plus water vapor (inert-free basis). I express the solids-to-gas ratio on an inert-free basis, since any inerts present in the gas increase its volume without entering into the reactions. I establish the upper limit of the foregoing range by taking the quantity of gas needed to produce a 63 percent reduced product at the end of the second step (lower limit) operating at 1400° F. (upper limit). My experience has shown that I can readily achieve an approach to equilibrium of about 80 percent under these conditions. I establish the lower limit by taking the quantity of gas needed to produce a 71 percent reduced product at the end of the second step (upper limit at 1000° F. (lower limit). My experience has shown that I can still achieve an approach to equilibrium of about 70 percent under these latter conditions. At my preferred operating temperature of 1300° F., the solids-to-gas ratio in the second step is about 57 pounds of iron per 1000 standard cubic feet of gas (inert-free basis). When off-gas from the second step is used for reduction in the first, the solids-to-gas ratio in the first step of course is the same as in the second. The solids-to-gas ratio in the third step is usually lower, since a lower ratio in this step facilitates production of a highly reduced final product.

The limits of about 63 to 71 percent reduction at the end of my second step are critical for attaining the advantages of my invention. The quantity of reducing gas used in a reduction step varies with the degree of reduction which takes place. Thus, if I reduce the product only to the foregoing range at the end of my second step, I use proportionately less gas in this step than if I reduced it to a higher degree, say 83 percent. I accomplish more reduction and use more gas in my third step than if it were merely a clean-up step applied to an already highly reduced product. Within the foregoing limits, the quantity of reducing gas I use in either my second or third step produces off-gas in a quantity I can consume efficiently in my first step, and I am able to achieve a 70 to 80 percent approach to equilibrium in my first step, as well as in my second step. My third step necessarily does not approach equilibrium this closely, since I achieve the maximum practical degree of reduction. I can operate my first step to full capacity and still handle the product efficiently in my second and third steps, thereby approximately doubling the output per unit of cross-sectional area of the reactor over a two-step process or any of the other three-step processes of which I am aware. At the same time the intermediate product from my second step is reduced sufficiently that I readily reduce it to a high degree (90 to 95 percent) in my third step. A further advantage is that I minimize the quantity of valuable constituents lost through purging. I purge off-gas from my first step from which a maximum of reducing constituents have been consumed, leaving a maximum concentration of inerts.

The benefits my invention attains can be demonstrated by comparing it with other three-step processes. In the following example I reduced a similar ore consisting essentially of minus ¼ inch $Fe_2O_3$. Column A lists the results when my invention is followed using off-gas from the second step as reductant in the first. Column B lists the results with similar flow of materials, but carrying the reduction to a higher degree in the second step. Column C lists the results with straight series flow of both solids and gases. In each instance the basis is one square foot of reactor cross-sectional area.

|  | A | B | C |
|---|---|---|---|
| First Step: |  |  |  |
| Bed Depth, Ft | 8 | 8 | 8 |
| Bed Temperature, F | 1,300 | 1,300 | 1,300 |
| Gas Rate, s.c.f.h | 5,100 | 4,324 | 4,392 |
| Gas Composition— |  |  |  |
| Percent $H_2$ | 66.8 | 69.0 | 65.9 |
| Percent $H_2O$ | 20.2 | 17.0 | 19.1 |
| Percent Inerts | 13.0 | 14.0 | 15.0 |
| Feed Rate, Lb. Fe/Hr | 250.9 | 126.8 | 124.0 |
| Feed Reduction, Percent | 0.0 | 0.0 | 0.0 |
| Product Reduction, Percent | 26.0 | 27.0 | 30.0 |
| Oxygen Removal Rate, Lb/Hr | 28.2 | 14.7 | 16.0 |
| Off-Gas Approach to Equilibrium, Percent | 70.7 | 53.8 | 60.3 |
| Solid-Gas Ratio, Lb. Fe/1,000 s.c.f. Gas | 49.2 | 29.3 | 28.2 |
| Solid-Gas Ratio (inert-free basis) | 56.5 | 34.1 | 33.2 |
| Second Step: |  |  |  |
| Bed Depth, Ft | 8 | 12 | 7 |
| Bed Temperature, F | 1,315 | 1,300 | 1,300 |
| Gas Rate, s.c.f.h | 5,100 | 4,324 | 4,392 |
| Gas Composition— |  |  |  |
| Percent $H_2$ | 87 | 86 | 74.7 |
| Percent $H_2O$ |  |  | 10.3 |
| Percent Inerts | 13 | 14 | 15 |
| Feed Rate, Lb. Fe/Hr | 250.9 | 126.8 | 124.0 |
| Feed Reduction, Percent | 26.0 | 27.0 | 30.0 |
| Product Reduction, Percent | 65.2 | 83.0 | 60.0 |
| Oxygen Removal Rate, Lb./Hr | 42.5 | 30.4 | 16.0 |
| Off-Gas Approach to Equilibrium, Percent | 77.8 | 67.0 | 77.4 |
| Solid-Gas Ratio, Lb. Fe/1,000 s.c.f. Gas | 49.2 | 29.3 | 28.2 |
| Solid-Gas Ratio (inert-free basis) | 56.5 | 34.1 | 33.2 |
| Third Step: |  |  |  |
| Bed Depth, Ft | 8 | 12 | 12 |
| Bed Temperature, F | 1,310 | 1,300 | 1,300 |
| Gas Rate, s.c.f.h | 5,800 | 4,300 | 4,392 |
| Gas Composition— |  |  |  |
| Percent $H_2$ | 87.0 | 86 | 85 |
| Percent $H_2O$ |  |  |  |
| Percent Inerts | 13.0 | 14 | 15 |
| Feed Rate, Lb. Fe/Hr | 250.9 | 126.8 | 124.0 |
| Feed Reduction, Percent | 65.2 | 83.0 | 60.0 |
| Product Reduction, Percent | 90.2 | 95.0 | 95.0 |
| Oxygen Removal Rate, Lb./Hr | 27.2 | 6.5 | 18.7 |
| Off-Gas Approach to Equilibrium, Percent | 43.8 | 14.3 | 40.8 |
| Solid-Gas Ratio, Lb. Fe/1,000 s.c.f. Gas | 43.3 | 29.5 | 28.2 |
| Solid-Gas Ratio (inert-free basis) | 49.7 | 34.3 | 33.2 |

While the foregoing example of my process shows less reduction in the final product that the processes chosen for comparison, it achieves approximately twice the feed rate. By reducing the product in the second step to a degree approaching the maximum within my critical range, I can easily achieve the same degree of reduction in my final product as the other processes.

From the foregoing description it is seen that my invention affords a simple effective way of improving the product, efficiency and productivity of a continuous direct reduction process for iron oxide in fluidized beds. My limits in the degree of reduction achieved in each step are novel and critical in attaining these benefits. While it might be predicted that my invention would attain some improvement in capacity over the prior art, I believe it is entirely unexpected that I can attain 100 percent improvement.

While I have shown and described certain preferred embodiments of my invention, it is apparent that other modifications may arise. Therefore, I do not wish to be limited to the disclosure set forth but only by the scope of the appended claim.

I claim:

In a continuous fluidized bed direct reduction process in which iron oxide fines are preheated to a temperature of about 1500 to 1900° F. and flow through first, second and third reduction steps in series, reducing gas consisting essentially of hydrogen is preheated to a temperature of about 1200 to 1500° F. and introduced separately to the second and third steps in parallel, off-gas from one of these steps is introduced to the first step, off-gas from the other of the second and third steps and off-gas from the first step are regenerated and combined for recycling, and the oxide is reduced substantially to FeO at the end of the first step, the combination therewith of a method of improving the utilization of said reducing gas and the degree of reduction of the final product comprising controlling the ratio of solids-to-gas in the second step to a range of about 35 to 65 pounds of iron per 1000 standard cubic feet of hydrgen plus water vapor and thereby limiting the reduction which takes place in the second step to furnish an intermediate product about 63 to 71 percent reduced, and reducing the intermediate product of the second step to a final product about 90 to 95 percent reduced in the third step.

References Cited in the file of this patent

UNITED STATES PATENTS

| | | |
|---|---|---|
| 2,711,368 | Lewis | June 21, 1955 |
| 2,864,686 | Agarwal | Dec. 16, 1958 |
| 2,864,688 | Reed | Dec. 16, 1958 |
| 2,915,379 | Agarwal | Dec. 1, 1959 |

FOREIGN PATENTS

| | | |
|---|---|---|
| 1,058,821 | France | Nov. 10, 1953 |